US012583300B2

(12) United States Patent
Wood et al.

(10) Patent No.: US 12,583,300 B2
(45) Date of Patent: Mar. 24, 2026

(54) AXLE ASSEMBLY FOR A VEHICLE

(71) Applicant: Schaeffler Technologies AG & Co. KG, Herzogenaurach (DE)

(72) Inventors: Joseph Wood, Wooster, OH (US); Scott Angel, Marshallville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 18/348,831

(22) Filed: Jul. 7, 2023

(65) Prior Publication Data

US 2025/0010697 A1    Jan. 9, 2025

(51) Int. Cl.
B60K 1/00 (2006.01)
B60K 17/16 (2006.01)

(52) U.S. Cl.
CPC ............... B60K 1/00 (2013.01); B60K 17/16 (2013.01); B60K 2001/001 (2013.01)

(58) Field of Classification Search
CPC .... B60K 1/00; B60K 17/16; B60K 2001/001; F16H 37/0813
See application file for complete search history.

(56) References Cited

U.S. PATENT DOCUMENTS

| | | | |
|---|---|---|---|
| 1,283,143 A | 10/1918 | Fries | |
| 6,609,649 B1 | 8/2003 | Barnholt et al. | |
| 10,724,618 B2 * | 7/2020 | Brown | B60K 1/00 |

FOREIGN PATENT DOCUMENTS

JP          2008224035 A      9/2008

* cited by examiner

*Primary Examiner* — Jason D Shanske
*Assistant Examiner* — James J Triggs
(74) *Attorney, Agent, or Firm* — Price Heneveld LLP

(57)          ABSTRACT

An axle assembly for a vehicle includes a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The axle assembly further includes an electric drive unit housed within the banjo axle housing and having a motor disposed within the receiving space that drives rotation of a rotor shaft, a first half shaft that extends within the first beam hollow, and a second half shaft that extends within the second beam hollow. The rotor shaft, the first half shaft, and the second half shaft are coaxially aligned.

20 Claims, 12 Drawing Sheets

AXLE ASSEMBLY FOR A VEHICLE

FIELD OF THE DISCLOSURE

The present disclosure generally relates to an axle assembly for a vehicle. More specifically, the present disclosure relates to an axle assembly that includes a banjo axle housing and an electric drive unit disposed within the banjo axle housing.

BACKGROUND OF THE DISCLOSURE

Axle assemblies can include housings to house various components, such as half shafts and differentials.

SUMMARY OF THE DISCLOSURE

According to a first aspect of the present disclosure, an axle assembly for a vehicle includes a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The axle assembly also includes an electric drive unit housed within the banjo axle housing, a first half shaft that extends within the first beam hollow, and a second half shaft that extends within the second beam hollow. The rotor shaft, the first half shaft, and the second half shaft are coaxially aligned. The electric drive unit includes a motor that drives rotation of a rotor shaft, and a housing disposed within the receiving space defined by the central portion of the banjo axle housing and fastened to the central portion. The housing has a motor housing portion that is configured to house the motor, a first lateral portion mounted to the motor housing portion via a plurality of fasteners, and a second lateral portion mounted to the motor housing portion via a plurality of fasteners opposite the first lateral portion. The motor housing portion is positioned axially between the first and second lateral portions of the housing.

Embodiments of the first aspect of the disclosure can include any one or a combination of the following features:
a first wheel hub coupled to the first half shaft, a first wheel bearing disposed radially between the first wheel hub and the first beam and configured to support the first wheel hub and facilitate rotation of the first wheel hub relative to the first beam, a second wheel hub coupled to the second half shaft, and a second wheel bearing disposed radially between the second wheel hub and the second beam and configured to support the second wheel hub and facilitate rotation of the second wheel hub relative to the second beam;
the electric drive unit further includes a first output shaft operably coupled with the rotor shaft, such that rotation of the rotor shaft drives rotation of the first output shaft, a first bearing coupled to the first lateral portion of the housing and configured to support and facilitate rotation of the first output shaft relative to the first lateral portion, wherein the first half shaft is engaged with the first output shaft, such that the first half shaft rotates with the first output shaft, a second output shaft operably coupled with the rotor shaft, such that rotation of the rotor shaft drives rotation of the second output shaft, and a second bearing coupled to the second lateral portion of the housing and configured to support and facilitate rotation of the second output shaft relative to the second lateral portion, wherein the second half shaft is engaged with the second output shaft, such that the second half shaft rotates with the second output shaft;
the first lateral portion forms a gearbox of the electric drive unit that houses a gearset;
the first and second beams are integrally coupled with the central portion of the banjo axle housing;
the motor housing portion of the housing is bolted to the central portion of the housing; and
the first lateral portion is bolted to the motor housing portion and the second lateral portion is bolted to the motor housing portion.

According to a second aspect of the present disclosure, an axle assembly for a vehicle includes a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The axle assembly further includes an electric drive unit housed within the banjo axle housing, a first half shaft that extends within the first beam hollow, and a second half shaft that extends within the second beam hollow. The rotor shaft, the first half shaft, and the second half shaft are coaxially aligned. The electric drive unit includes a motor that drives rotation of a rotor shaft, and a housing that houses the motor and that is disposed within the receiving space defined by the central portion of the banjo axle housing. The housing has a first portion and a second portion that is fastened to and positioned axially adjacent to the first portion of the housing. At least one of the first portion and the second portion is fastened to the central portion of the banjo axle housing.

Embodiments of the second aspect of the disclosure can include any one or a combination of the following features:
a first wheel hub coupled to the first half shaft, a first wheel bearing disposed radially between the first wheel hub and the first beam and configured to support the first wheel hub and facilitate rotation of the first wheel hub relative to the first beam, a second wheel hub coupled to the second half shaft, and a second wheel bearing disposed radially between the second wheel hub and the second beam and configured to support the second wheel hub and facilitate rotation of the second wheel hub relative to the second beam;
the first portion is fastened to the central portion;
the second portion is fastened to the central portion;
the first portion houses the motor and the second portion forms a gearbox of the electric drive unit that houses a gearset; and
the first and second beams are integrally coupled with the central portion of the banjo axle housing.

According to a third aspect of the present disclosure, an axle assembly for a vehicle includes a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The axle assembly further includes an electric drive unit housed within the banjo axle housing and having a motor disposed within the receiving space that drives rotation of a rotor shaft, a first half shaft that extends within the first beam hollow, and a second half shaft that extends within the second beam hollow. The rotor shaft, the first half shaft, and the second half shaft are coaxially aligned.

Embodiments of the third aspect of the disclosure can include any one or a combination of the following features:

a first wheel hub coupled to the first half shaft, a first wheel bearing disposed radially between the first wheel hub and the first beam and configured to support the first wheel hub and facilitate rotation of the first wheel hub relative to the first beam, a second wheel hub coupled to the second half shaft, and a second wheel bearing disposed radially between the second wheel hub and the second beam and configured to support the second wheel hub and facilitate rotation of the second wheel hub relative to the second beam;

the electric drive unit further includes a housing that houses the motor and that is disposed within the receiving space defined by the central portion of the banjo axle housing, the housing having a first portion that is fastened to the central portion, and a second portion that is positioned axially adjacent to the first portion of the housing;

the first portion is a motor housing portion of the housing, the second portion is a first lateral portion of the housing, and the housing further includes a second lateral portion that is fastened to and positioned axially adjacent to the motor housing portion of the housing, wherein the motor housing portion is positioned axially between the first and second lateral portions of the housing;

the first lateral portion forms a gearbox of the electric drive unit that houses a gearset;

the motor housing portion of the housing is bolted to the central portion of the banjo axle housing, the first lateral portion of the housing is bolted to the motor housing portion, and the second lateral portion is bolted to the motor housing portion; and the first and second beams are integrally coupled with the central portion of the banjo axle housing.

These and other features, advantages, and objects of the present disclosure will be further understood and appreciated by those skilled in the art by reference to the following specification, claims, and appended drawings.

Figure 1:
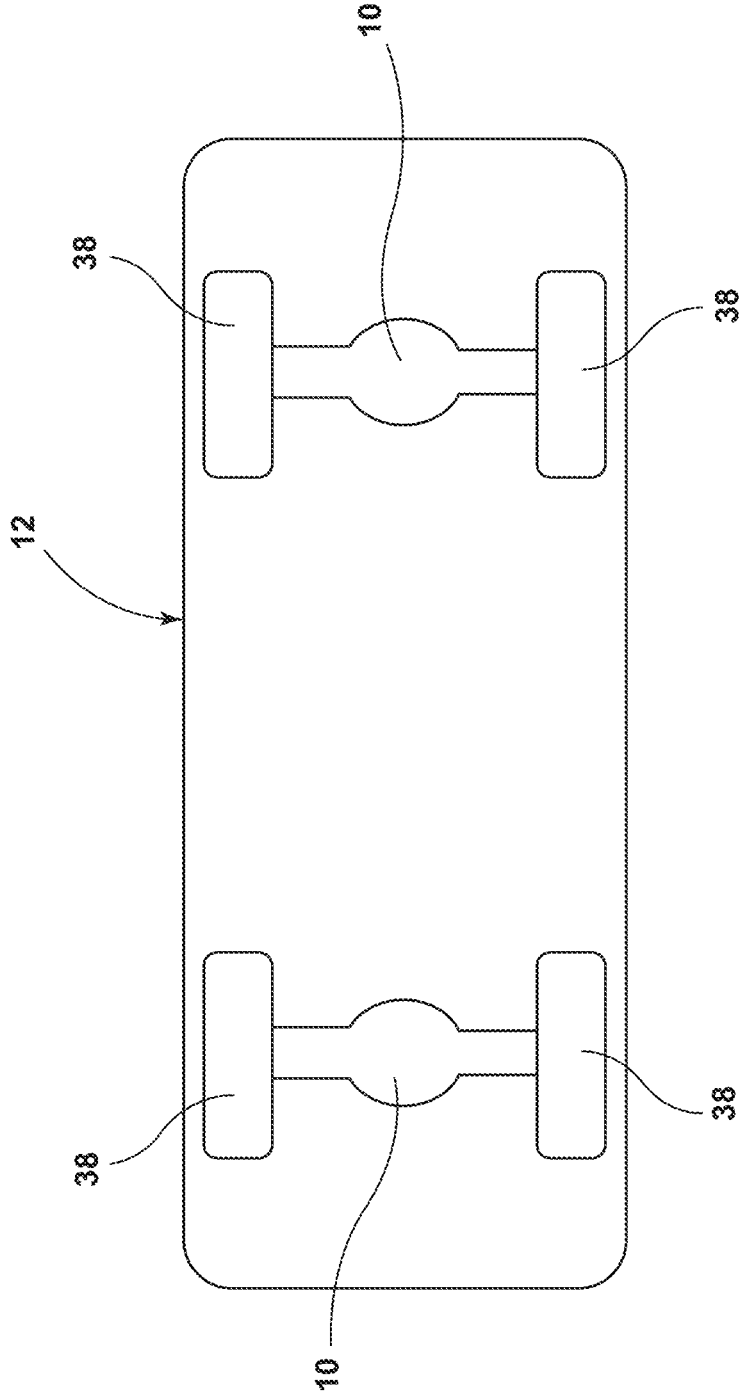
FIG. 1 is a schematic view of a vehicle that includes an axle assembly and wheels.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. Further, the term "coaxial" and derivatives thereof, such as "coaxially aligned," shall be understood to refer to elements configured to rotate about a common axis.

Referring now to FIGS. 1-12, an axle assembly 10 for a vehicle 12 includes a banjo axle housing 14. The banjo axle housing 14 includes a central portion 16 that defines a receiving space 18. A first beam 20 extends from the central portion 16 in a first axial direction and defines a first beam hollow 22 that is in communication with the receiving space 18. A second beam 24 extends from the central portion 16 opposite the first beam 20 in a second axial direction. The second beam 24 defines a second beam hollow 26 that is in communication with the receiving space 18. The axle assembly 10 includes an electric drive unit 28. The electric drive unit 28 is housed within the banjo axle housing 14. The electric drive unit 28 includes a motor 30 that is disposed within the receiving space 18 and is configured to drive rotation of a rotor shaft 36. A first half shaft 32 extends within the first beam hollow 22. A second half shaft 34 extends within the second beam hollow 26. The rotor shaft 36, the first half shaft 32, and the second half shaft 34 are coaxially aligned.

Referring to FIG. 1, a vehicle 12 that includes the axle assembly 10 is illustrated. The axle assembly 10 includes the first and second half shafts 32, 34 that are operably coupled to wheels 38 of the vehicle 12, as illustrated in FIG. 1. A variety of types of vehicles 12 are contemplated.

Figure 4:
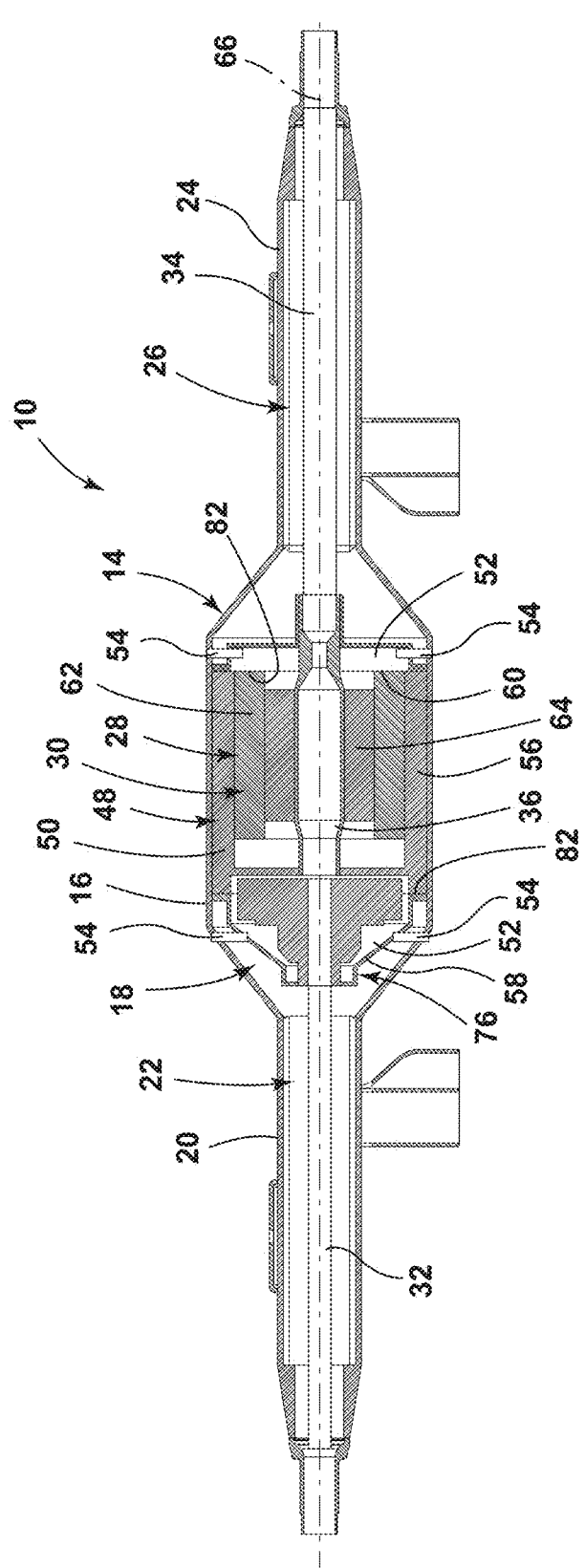
FIG. 4 is a cross-sectional view of the axle assembly of FIG. 3 taken at line IV-IV illustrating an electric drive unit housed within the banjo axle housing.
Figure 5:
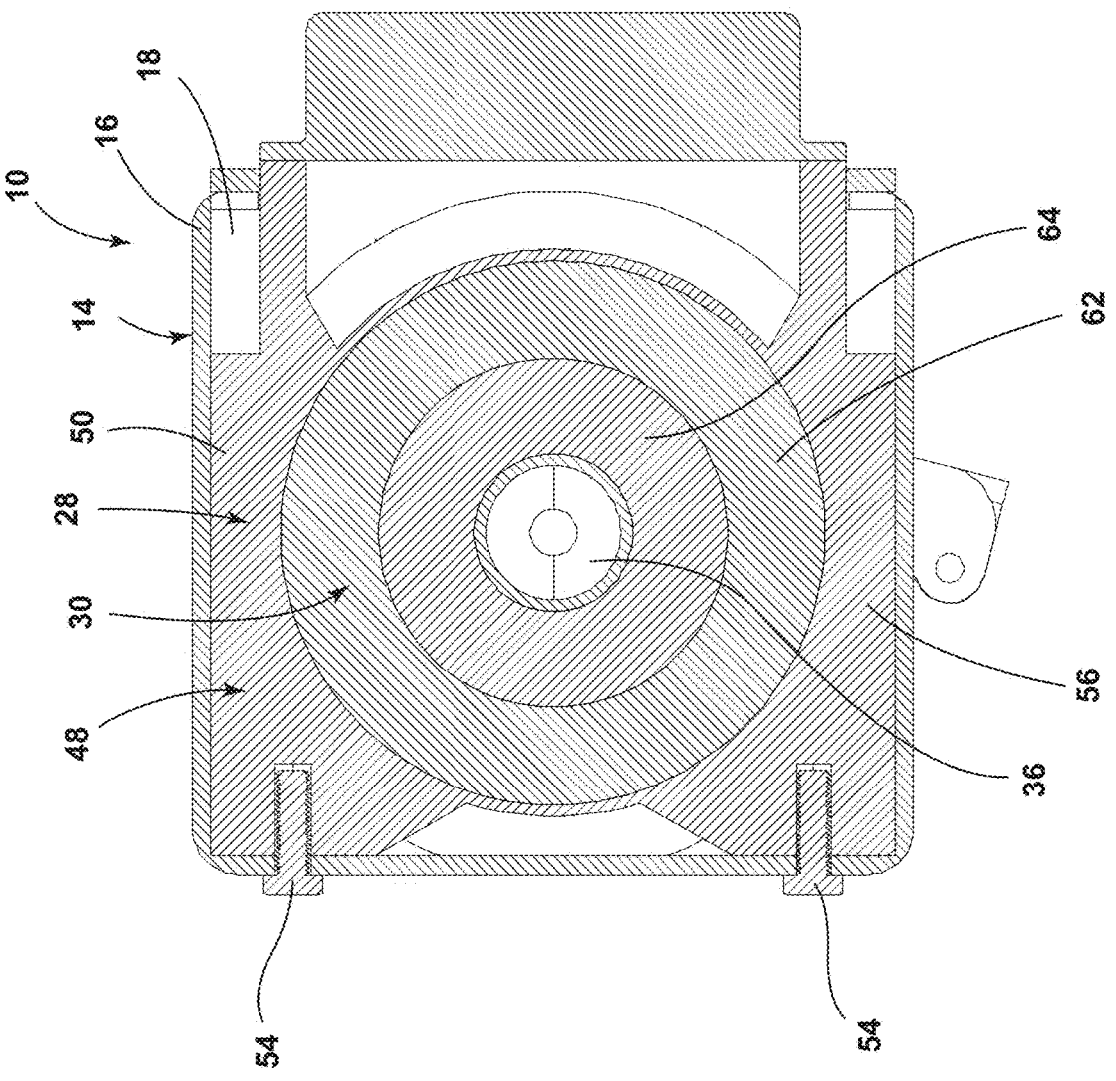
FIG. 5 is a cross-sectional view of the axle assembly of FIG. 3 taken at line V-V illustrating the electric drive unit disposed within the banjo axle housing and a housing of the electric drive unit fastened to a central portion of the banjo axle housing.
Figure 6:
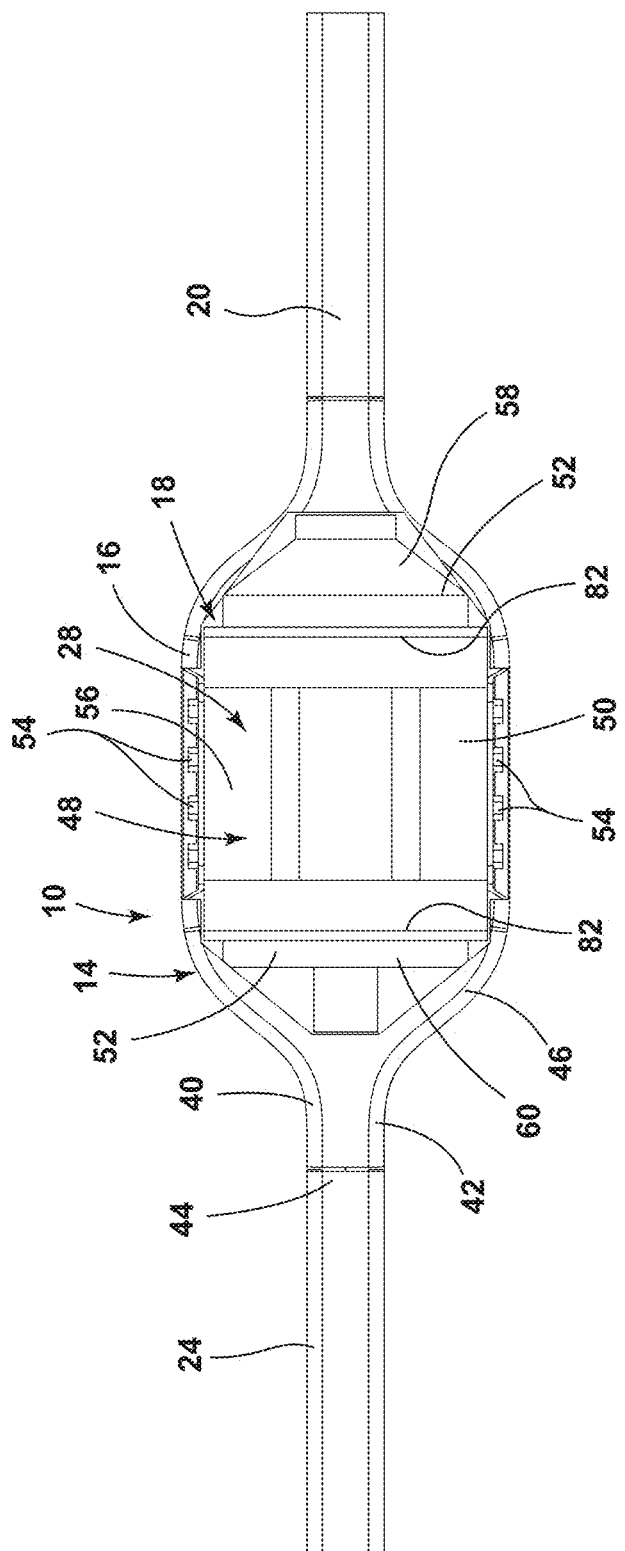
FIG. 6 is an elevational view of an axle assembly that includes a banjo axle housing and an electric drive unit housed within the banjo axle housing.
Figure 7:
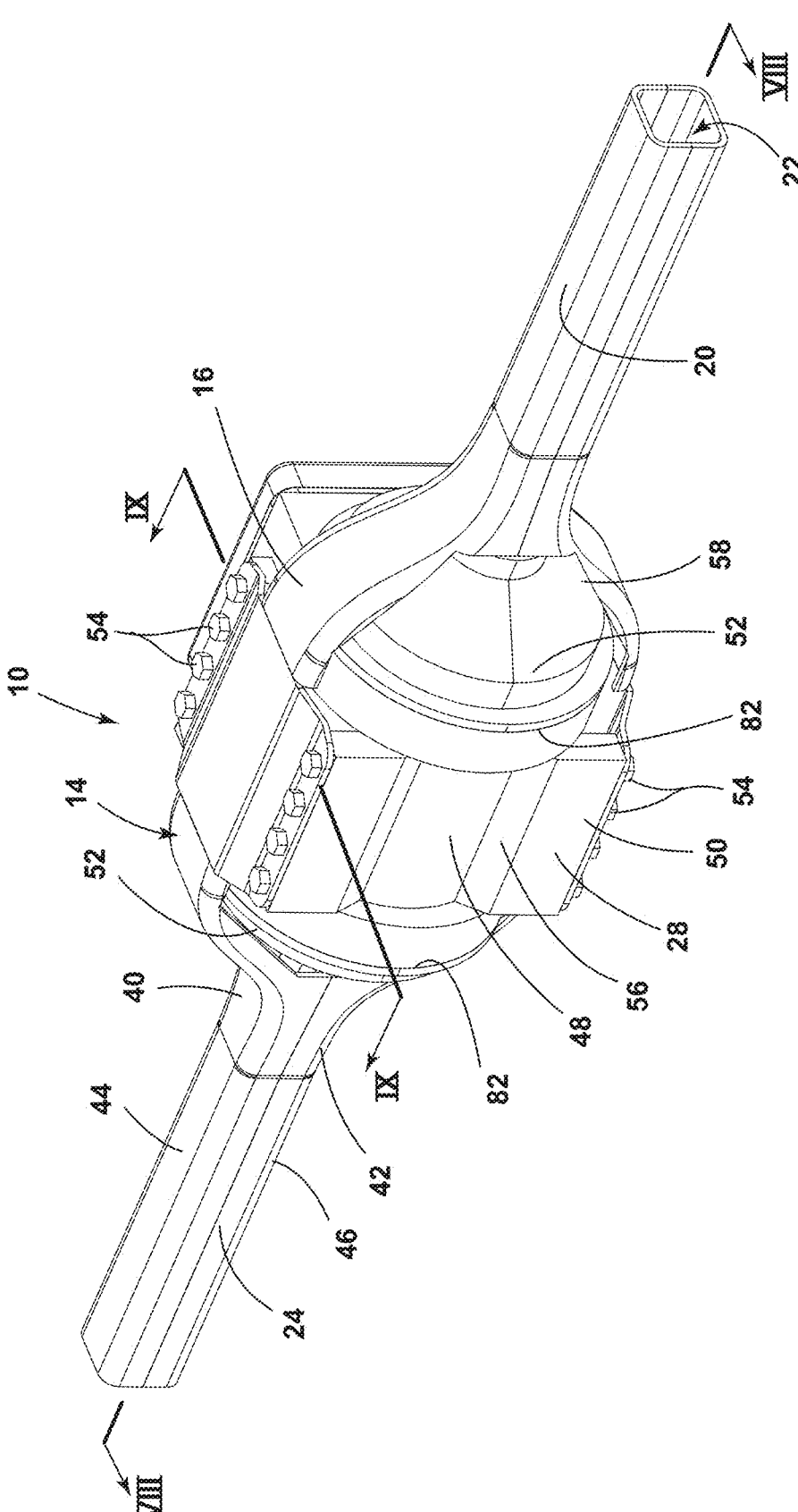
FIG. 7 is a top perspective view of an axle assembly that includes a banjo axle housing and an electric drive unit.
Figure 8:
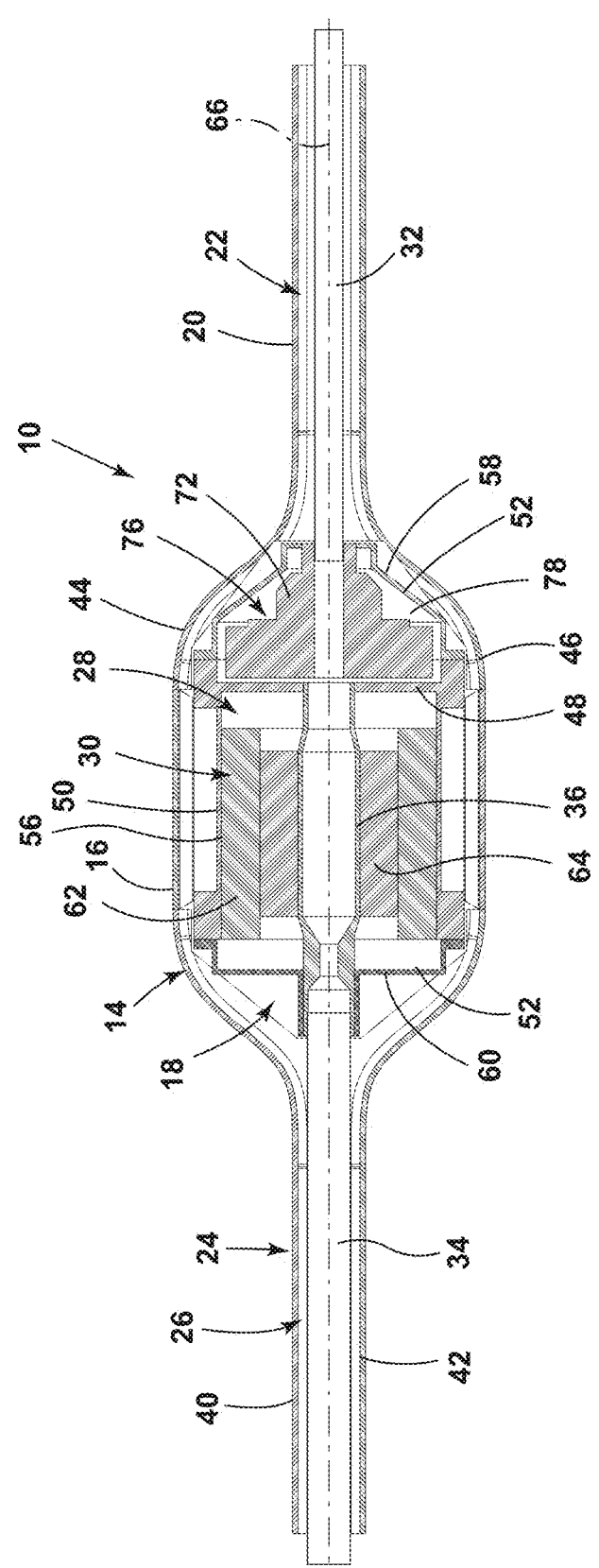
FIG. 8 is a cross-sectional view of the axle assembly of FIG. 7 taken at line VIII-VIII illustrating the electric drive unit housed within a central portion of the banjo axle housing.
Figure 9:
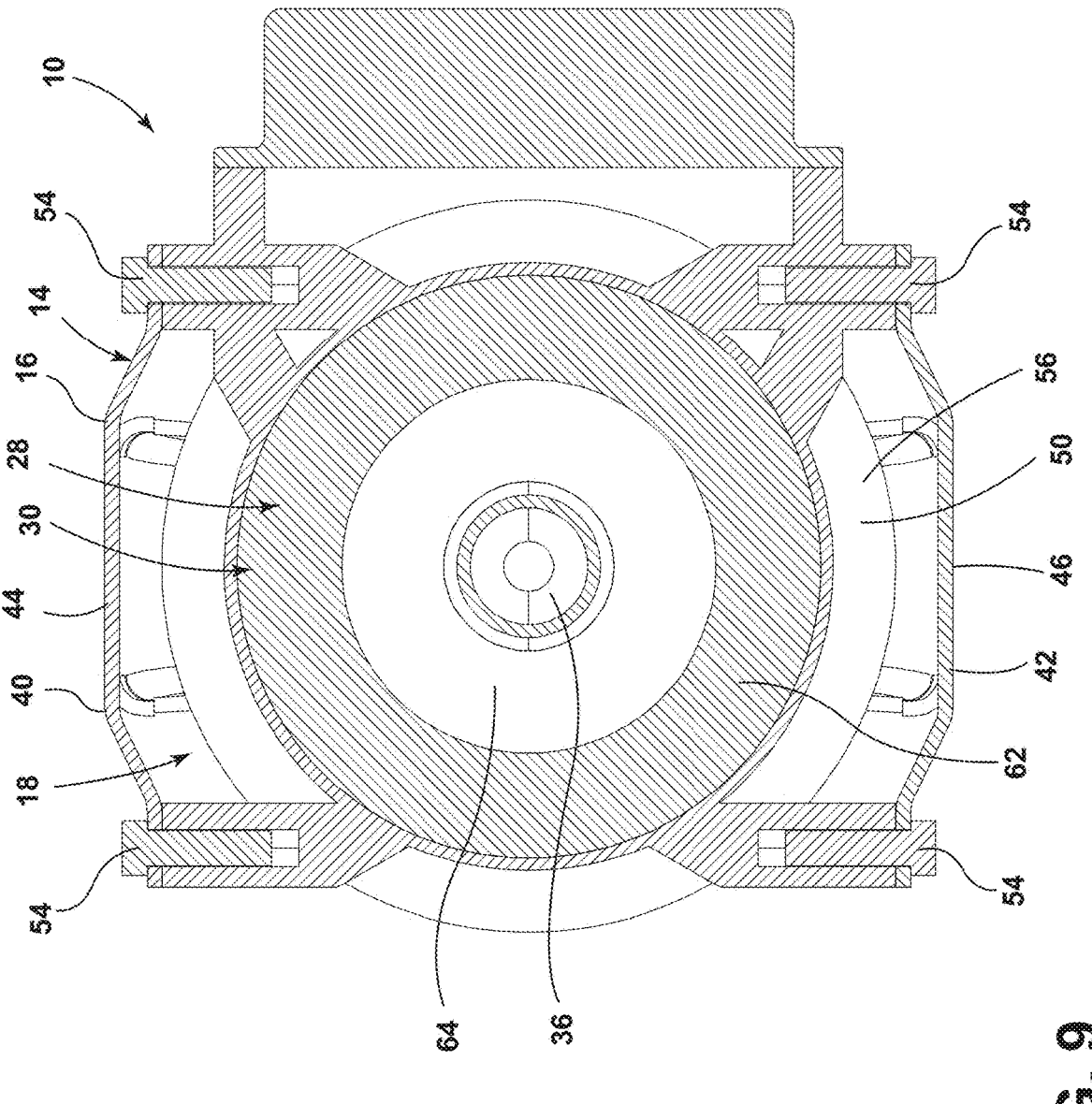
FIG. 9 is a cross-sectional view of the axle assembly of FIG. 7 taken at line IX-IX illustrating the electric drive unit disposed within and fastened to the central portion of the banjo axle housing.
Figure 10:
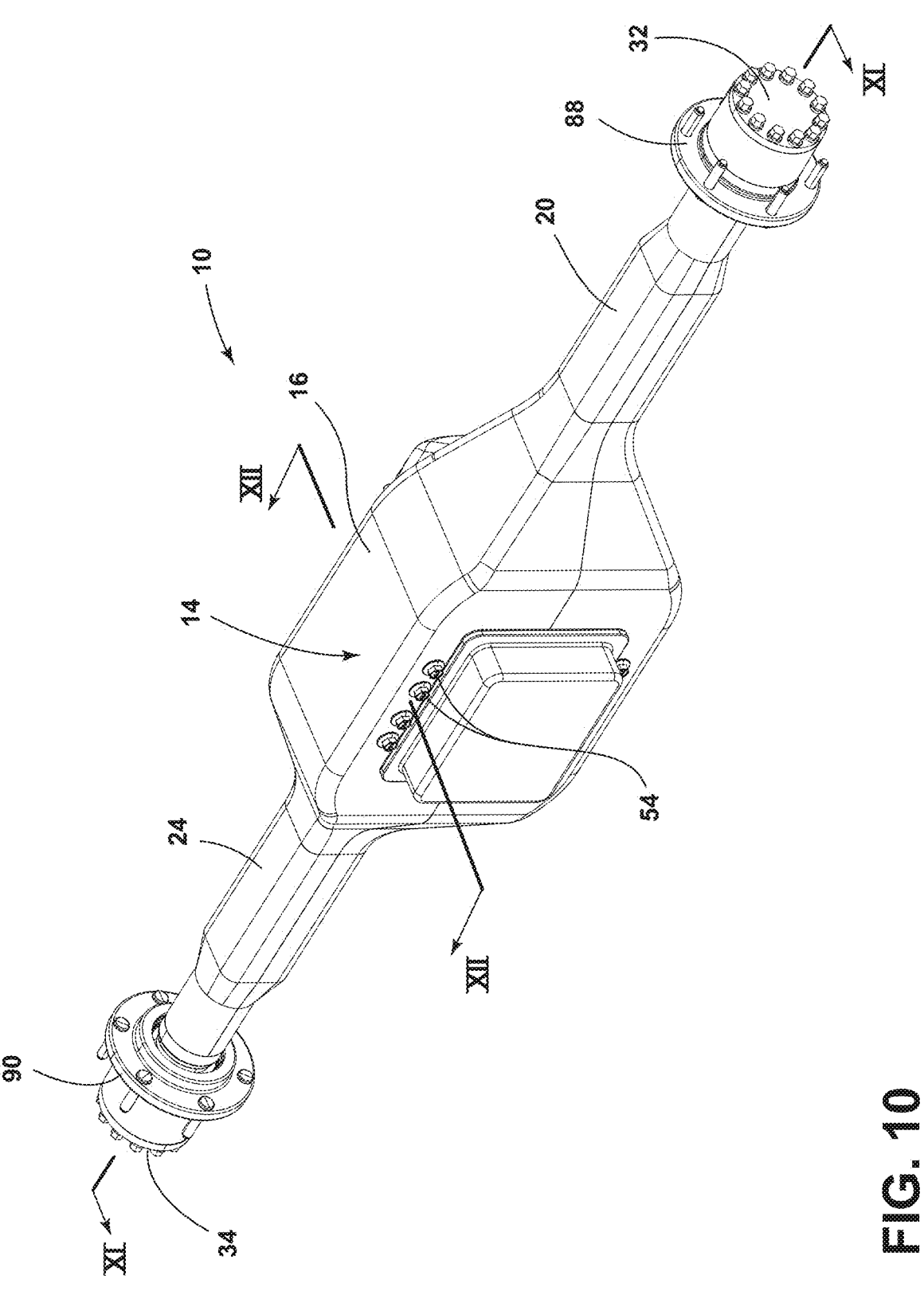
FIG. 10 is a top perspective view of an axle assembly that includes a banjo axle housing.
Figure 11:
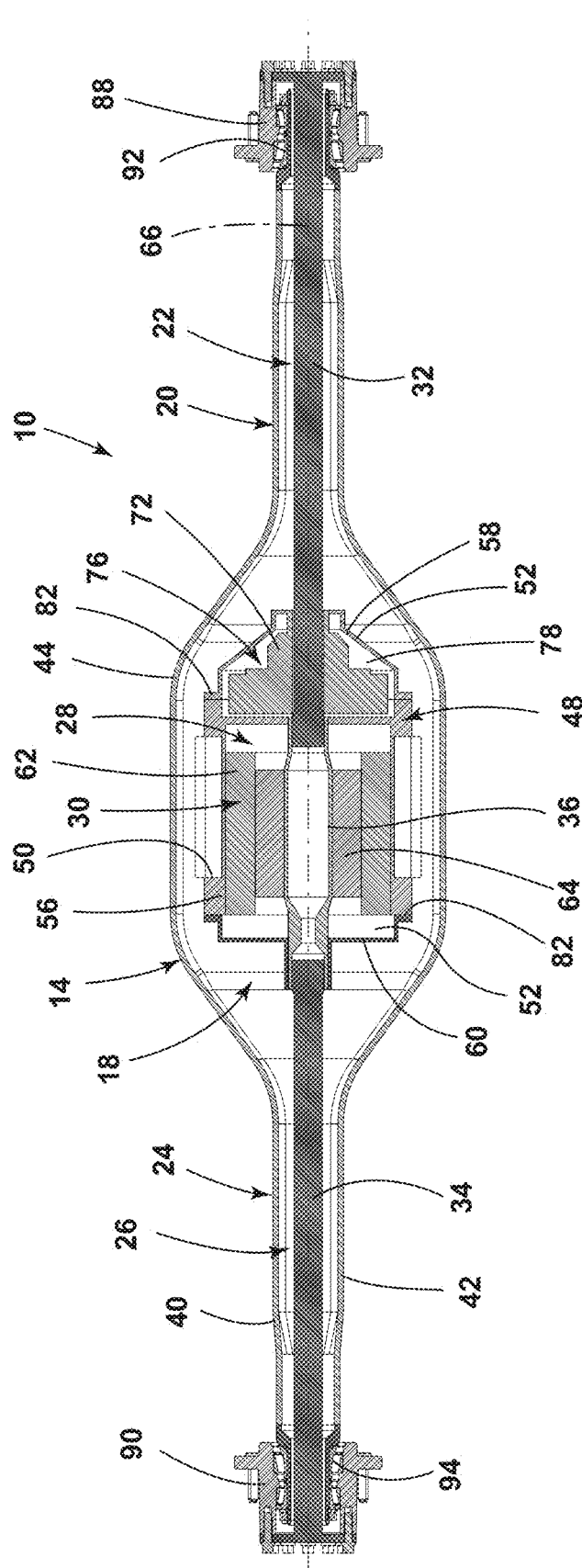
FIG. 11 is a cross-sectional view of the axle assembly of FIG. 10 taken at line XI-XI illustrating an electric drive unit disposed within a central portion of the banjo axle housing, and first and second wheel bearings disposed radially between first and second wheel hubs and first and second beams of the banjo axle housing, respectively.

Referring now to FIGS. 3-12, the axle assembly 10 includes the banjo axle housing 14. The banjo axle housing 14 includes the central portion 16. As illustrated in FIGS. 4, 6-8, 11, and 12, the central portion 16 of the banjo axle housing 14 defines the receiving space 18. The first beam 20 extends axially outward from the central portion 16 in the first axial direction. As illustrated in FIGS. 4, 8, and 11, the first beam 20 defines the first beam hollow 22, and the first beam hollow 22 is in communication with the receiving space 18 defined by the central portion 16 of the banjo axle housing 14. The second beam 24 extends axially outward from the central portion 16 opposite the first beam 20 in the second axial direction. The second beam 24 defines the second beam hollow 26, as illustrated in FIGS. 4, 8, and 11, and the second beam hollow 26 is in communication with the receiving space 18 defined by the central portion 16 of the banjo axle housing 14. In some embodiments, the banjo axle housing 14 includes first and second halves 40, 42 that are fixed to each other. For example, in the embodiment of the banjo axle housing 14 illustrated in FIG. 6, the banjo axle housing 14 includes a top half 44 and a bottom half 46 that is welded to the top half 44, such that the top and bottom halves 44, 46 define the receiving space 18, the first beam hollow 22, and the second beam hollow 26. In various embodiments, the central portion 16 of the banjo axle housing 14 has a larger footprint in vehicle-vertical directions and vehicle-longitudinal directions than the footprints of the first and second beams 20, 24 of the banjo axle housing 14. In various embodiments, the central portion 16, the first beam 20, and the second beam 24 can be integrally coupled with each other. In an exemplary embodiment, the first half 40 and the second half 42 of the banjo axle housing 14 are each single unitary metal bodies that are welded to each other to form the central portion 16, the first beam 20, and the second beam 24 of the banjo axle housing 14.

Referring now to FIGS. 2-12, the axle assembly 10 includes the electric drive unit 28. The electric drive unit 28 is housed within the banjo axle housing 14, in various embodiments, as illustrated in FIGS. 4-9, 11, and 12. The electric drive unit 28 includes a housing 48. The housing 48 is disposed within the receiving space 18 defined by the central portion 16 of the banjo axle housing 14. The housing 48 can be an assembly of a plurality of components. For example, the housing 48 can be a die-cast aluminum housing 48 that is formed of a plurality of components fastened to each other. In various embodiments, the housing 48 includes a first portion 50 and a second portion 52. The second portion 52 may be fastened to the first portion 50 and positioned axially adjacent to the first portion 50 of the housing 48. The first portion 50 of the housing 48 and/or the second portion 52 of the housing 48 may be fastened to and/or may abut the central portion 16 of the banjo axle housing 14, in various embodiments. For example, in the embodiment illustrated in FIGS. 4 and 5, the first portion 50 of the housing 48 is fastened to the central portion 16 of the banjo axle housing 14 with bolts 54, and the second portion 52 of the housing 48 is fastened to the central portion 16 of the banjo axle housing 14 with bolts 54. In the embodiment illustrated in FIGS. 8 and 9, the first portion 50 of the housing 48 is fastened to the central portion 16 of the banjo axle housing 14, and the second portion 52 of the housing 48 abuts the central portion 16 of the banjo axle housing 14.

Referring still to FIGS. 2-12, in some implementations, the housing 48 includes a motor housing portion 56, a first lateral portion 58 that is mounted to the motor housing portion 56 via a plurality of fasteners 54, and a second lateral portion 60 that is mounted to the motor housing portion 56 via a plurality of fasteners 54 opposite the first lateral portion 58. As illustrated in FIGS. 4, 6, 8, and 11, the motor housing portion 56 is positioned axially between the first and second lateral portions 58, 60 of the housing 48. In various implementations, the first portion 50 of the housing 48 may be the motor housing portion 56 of the housing 48, and the second portion 52 of the housing 48 may be one of the first lateral portion 58 of the housing 48 and the second lateral portion 60 of the housing 48.

As illustrated in FIGS. 5-7, 9, and 12, the motor housing portion 56 of the housing 48 may be fastened to (i.e., mounted to via one or more fasteners 54) the central portion 16 of the banjo axle housing 14. For example, in the embodiment illustrated in FIG. 5, the motor housing portion 56 is bolted to the central portion 16 of the banjo axle housing 14 via a plurality of bolts 54 that extend vehicle-longitudinally. In the embodiment illustrated in FIGS. 6-9, the motor housing portion 56 of the housing 48 is bolted to the central portion 16 of the banjo axle housing 14 via a plurality of bolts 54 that extend vertically through the central portion 16 of the first and second halves 40, 42 of the banjo axle housing 14 into the motor housing portion 56 of the housing 48.

Figure 2:
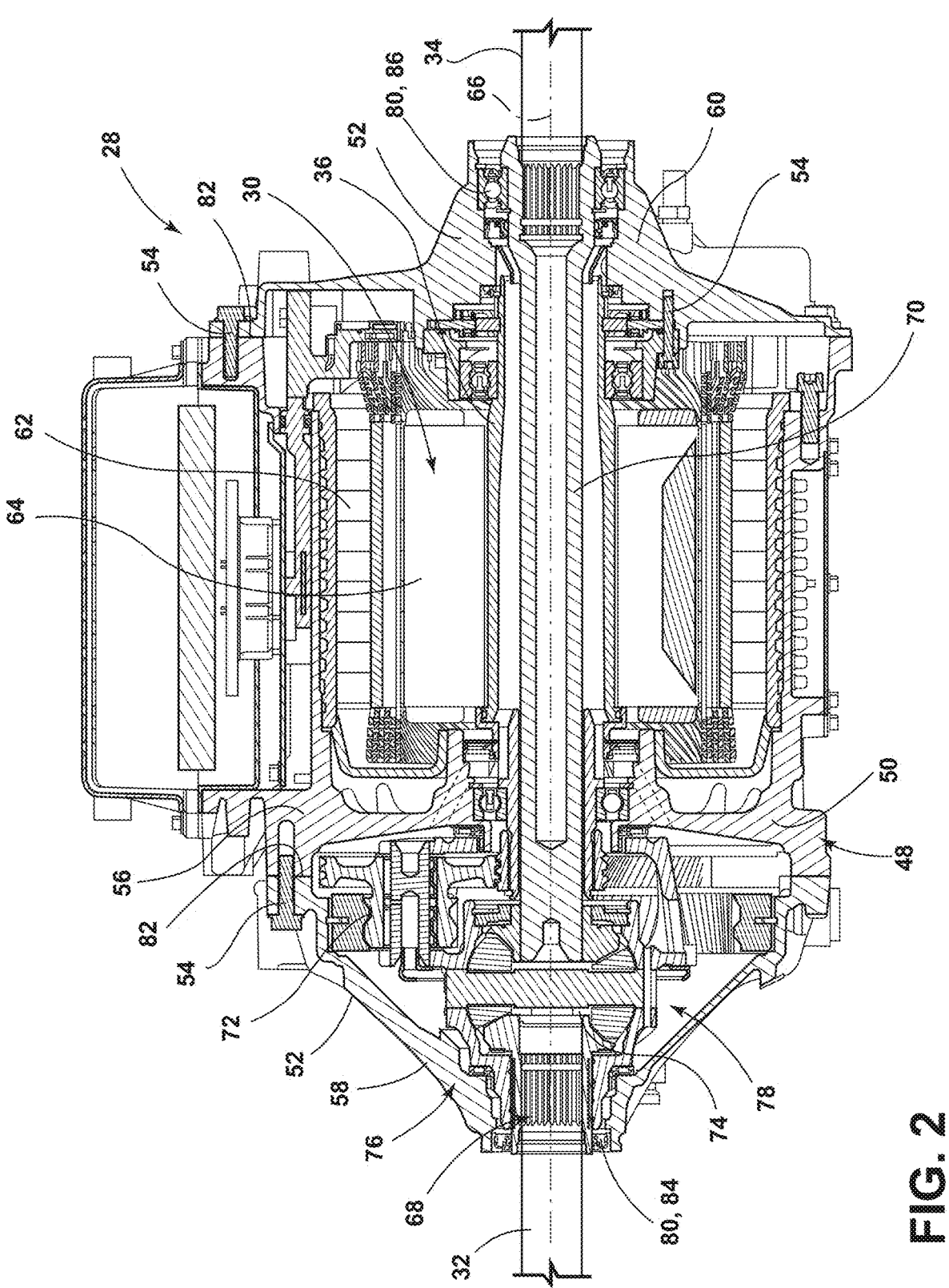
FIG. 2 is a cross-sectional view of a drive unit.
Figure 3:
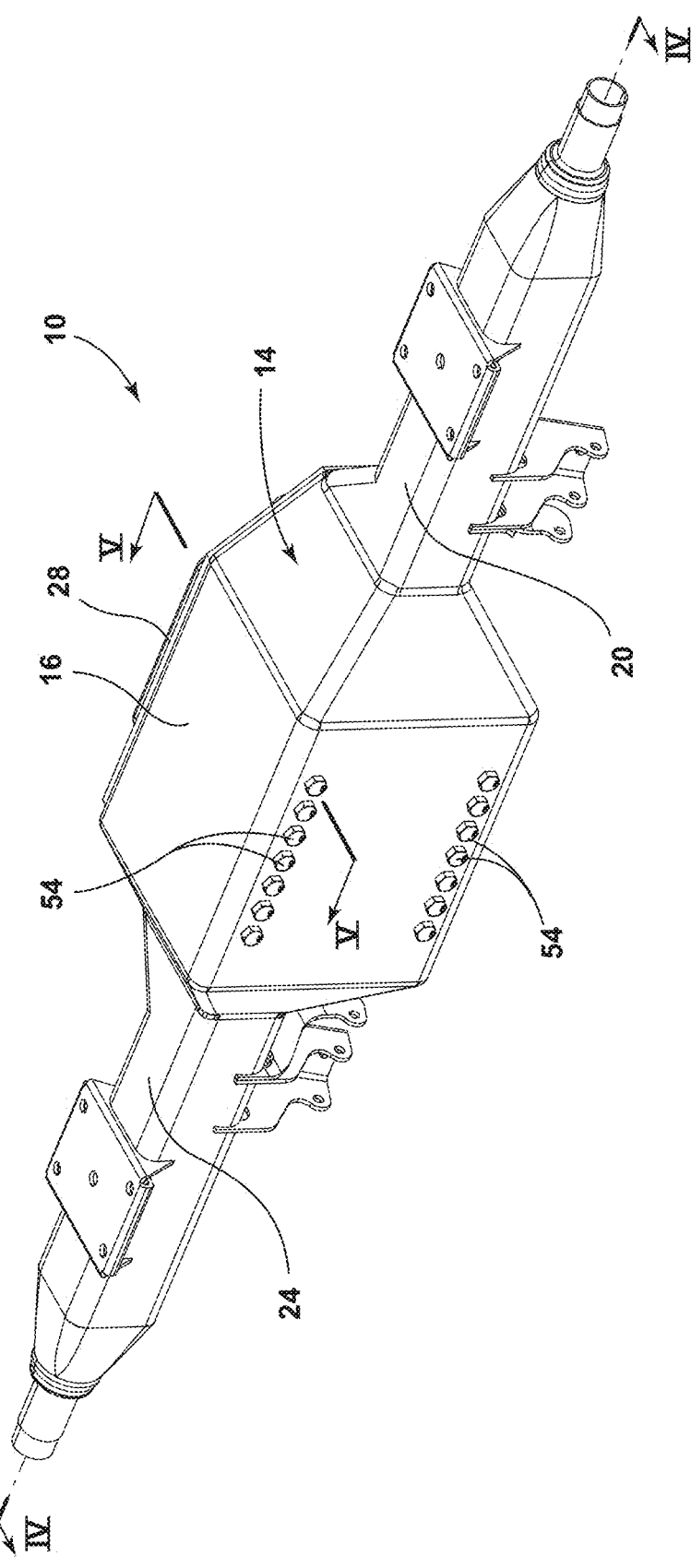
FIG. 3 is a top perspective view of an axle assembly that includes a banjo axle housing.

Referring still to FIGS. 2-12, in some implementations, the first and/or second lateral portions 58, 60 of the housing 48 may be fastened to and/or abut the central portion 16 of the banjo axle housing 14. For example, in the embodiment illustrated in FIG. 4, the first and second lateral portions 58, 60 of the housing 48 are bolted to the central portion 16 of the banjo axle housing 14 via a plurality of bolts 54. In the embodiment illustrated in FIG. 8, the first and second lateral portions 58, 60 of the housing 48 abut the central portion 16 of the banjo axle housing 14. As illustrated in FIG. 2, the first lateral portion 58 of the housing 48 is fastened to the motor housing portion 56 via one or more bolts 54, and the second lateral portion 60 of the housing 48 is fastened to the motor housing portion 56 via one or more bolts 54.

In various implementations, the first lateral portion 58 of the housing 48 abuts the central portion 16 of the housing 48, such that movement of the first lateral portion 58 in a first axial direction is restricted via the abutment of the first lateral portion 58 and the central portion 16. Further, in some implementations, the second lateral portion 60 abuts the central portion 16, such that movement of the second lateral portion 60 in a second axial direction that is opposite the first axial direction is restricted due to contact between the second lateral portion 60 and the central portion 16.

Figure 12:
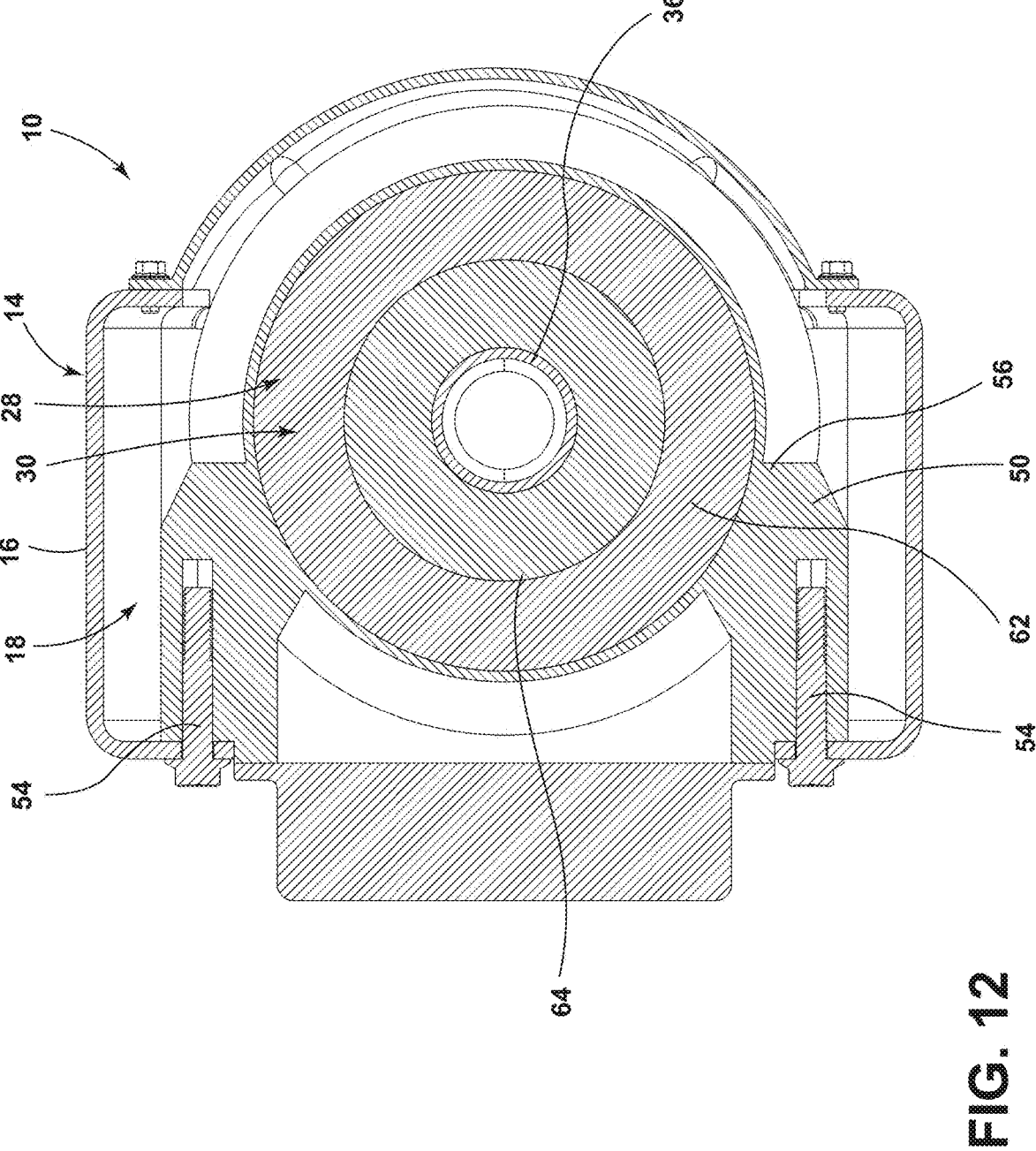
FIG. 12 is a cross-sectional view of the axle assembly of FIG. 10 taken at line XII-XII illustrating the electric drive unit disposed within and fastened to the central portion of the banjo axle housing.

Referring still to FIGS. 2-12, the electric drive unit 28 includes the motor 30. The motor 30 can include a stator 62 and a rotor 64. The motor 30 is configured to drive rotation of the rotor shaft 36 that is positioned radially inboard of the rotor 64 about an axis 66. In various implementations, rotation of the rotor shaft 36 is configured to drive first and second output shafts 68, 70 that are operably coupled to the rotor shaft 36 via a gearset 72 and differential 74 that are disposed within a gearbox 76. As illustrated in FIG. 12, a first bearing 84 is coupled to the first lateral portion 58 of the housing 48, and a second bearing 86 is coupled to the second lateral portion 60 of the housing 48. The first bearing 84 is configured to support and facilitate rotation of the first output shaft 68 relative to the first lateral portion 58, and the second bearing 86 is configured to support and facilitate rotation of the second output shaft 70 relative to the second lateral portion 60. In various implementations, the first lateral portion 58 of the housing 48 forms at least a portion of the gearbox 76. For example, in the embodiment illustrated in FIG. 2, the first lateral portion 58 of the housing 48 cooperates with the motor housing portion 56 of the housing 48 to form the gearbox 76. The gearbox 76 may additionally serve as a reservoir 78 for fluid that is utilized in the electric drive unit 28, in various implementations. As illustrated in FIG. 2, the motor 30 of the electric drive unit 28 is disposed within the motor housing portion 56 of the housing 48.

Referring still to FIGS. 2-12, the axle assembly 10 includes the first and second half shafts 32, 34. As illustrated in FIG. 2, the first and second half shafts 32, 34 are engaged with the first and second output shafts 68, 70 and extend outward in first and second axial directions, respectively, from the first and second output shafts 68, 70. As illustrated in FIG. 12, a first wheel hub 88 is coupled to the first half shaft 32, and a second wheel hub 90 is coupled to the second half shaft 34. Wheels 38 of the vehicle 12 are configured to be mounted to the first and second wheel hubs 88, 90. As further illustrated in FIG. 12, a first wheel bearing 92 is disposed radially between the first wheel hub 88 and the first beam 20 of the banjo axle housing 14, and a second wheel bearing 94 is disposed radially between the second wheel hub 90 and the second beam 24 of the banjo axle housing 14. The first wheel bearing 92 is configured to support the first wheel hub 88 and facilitate rotation of the first wheel hub 88 relative to the first beam 20. The second wheel bearing 94 is configured to support the second wheel hub 90 and facilitate rotation of the second wheel hub 90 relative to the second beam 24.

In operation of the electric drive unit 28, the motor 30 drives rotation of the rotor shaft 36 which is operably coupled to the first and second output shafts 68, 70 and the first and second half shafts 32, 34 via the gearset 72 and differential 74, such that the first and second half shafts 32, 34 rotate with the first and second output shafts 68, 70 to drive rotation of wheels 38 of the vehicle 12. As illustrated in FIGS. 2, 4, and 8, the rotor shaft 36, first and second output shafts 68, 70, and first and second half shafts 32, 34 are coaxially aligned. As illustrated in FIGS. 4, 8, and 11, in various embodiments, the first half shaft 32 extends within the first beam hollow 22, and the second half shaft 34 extends within the second beam hollow 26 defined by the second beam 24 of the banjo axle housing 14.

The axle assembly 10 of the present disclosure may provide a variety of advantages. For example, the banjo axle housing 14 may provide support that distributes stress from the housing 48 of the electric drive unit 28 into the banjo axle housing 14 to decrease wear and tear on the electric drive unit 28. As illustrated in FIG. 2, the first and second output shafts 68, 70 are supported by bearings 80 (e.g., the first and second bearings 84, 86) that are seated within the first and second lateral portions 58, 60 of the housing 48 of the electric drive unit 28, respectively. The first and second half shafts 32, 34 are engaged with the first and second output shafts 68, 70, respectively, and extend outward in first and second axial directions, respectively, to the first and second wheel hubs 88, 90 to which wheels 38 of the vehicle 12 are mounted. In operation of the vehicle 12, loads exerted on distal ends of the first and second half shafts 32, 34 result in considerable force being exerted on the first and second wheel hubs 88, 90. This force is distributed to the banjo axle housing 14 via the first and second wheel hubs 88, 90 being supported by the first and second wheel bearings 92, 94 that are operably coupled with the first and second beams 20, 24 of the banjo axle housing 14, respectively. Distributing stress to the banjo axle housing 14 in this way may increase the longevity and performance of the axle assembly 10 relative to other axle assembly designs. For example, the axle assembly 10 of the present disclosure may advantageously reduce stress on joints 82 of the first and second lateral portions 58, 60 of the housing 48 and the motor housing portion 56 of the housing 48, relative to an axle assembly design that includes beams for housing the first and second half shafts that are coupled directly to the housing of an electric drive unit rather than the central portion 16 of the banjo axle housing 14.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 axle assembly
12 vehicle
14 banjo axle housing
16 central portion
18 receiving space
20 first beam
22 first beam hollow
24 second beam 26 second beam hollow
28 electric drive unit
30 motor
32 first half shaft
34 second half shaft
36 rotor shaft
38 wheels
40 first half
42 second half
44 top half
46 bottom half
48 housing
50 first portion
52 second portion
54 fastener/bolts
56 motor housing portion
58 first lateral portion
60 second lateral portion
62 stator
64 rotor
66 axis
68 first output shaft
70 second output shaft
72 gearset
74 differential
76 gearbox
78 reservoir
80 bearings
82 joints
84 first bearing
86 second bearing
88 first wheel hub
90 second wheel hub
92 first wheel bearing
94 second wheel bearing

What is claimed is:

1. An axle assembly for a vehicle, comprising:
a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space;
an electric drive unit housed within the banjo axle housing, the electric drive unit comprising:
a motor that drives rotation of a rotor shaft; and
a housing disposed within the receiving space defined by the central portion of the banjo axle housing and fastened to the central portion, the housing having a motor housing portion that is configured to house the motor, a first lateral portion mounted to the motor housing portion via a plurality of fasteners, and a second lateral portion mounted to the motor housing portion via a plurality of fasteners opposite the first lateral portion, wherein the motor housing portion is positioned axially between the first and second lateral portions of the housing;
a first half shaft that extends within the first beam hollow; and
a second half shaft that extends within the second beam hollow, wherein the rotor shaft, the first half shaft, and the second half shaft are coaxially aligned.

2. The axle assembly of claim 1, further comprising:
a first wheel hub coupled to the first half shaft;

a first wheel bearing disposed radially between the first wheel hub and the first beam and configured to support the first wheel hub and facilitate rotation of the first wheel hub relative to the first beam;
a second wheel hub coupled to the second half shaft; and
a second wheel bearing disposed radially between the second wheel hub and the second beam and configured to support the second wheel hub and facilitate rotation of the second wheel hub relative to the second beam.

3. The axle assembly of claim 2, wherein the electric drive unit further comprises:
a first output shaft operably coupled with the rotor shaft, such that rotation of the rotor shaft drives rotation of the first output shaft;
a first bearing coupled to the first lateral portion of the housing and configured to support and facilitate rotation of the first output shaft relative to the first lateral portion, wherein the first half shaft is engaged with the first output shaft, such that the first half shaft rotates with the first output shaft;
a second output shaft operably coupled with the rotor shaft, such that rotation of the rotor shaft drives rotation of the second output shaft; and
a second bearing coupled to the second lateral portion of the housing and configured to support and facilitate rotation of the second output shaft relative to the second lateral portion, wherein the second half shaft is engaged with the second output shaft, such that the second half shaft rotates with the second output shaft.

4. The axle assembly of claim 3, wherein the first lateral portion forms a gearbox of the electric drive unit that houses a gearset.

5. The axle assembly of claim 3, wherein the first and second beams are integrally coupled with the central portion of the banjo axle housing.

6. The axle assembly of claim 1, wherein the motor housing portion of the housing is bolted to the central portion of the banjo axle housing, and wherein the first lateral portion is bolted to the motor housing portion, and the second lateral portion is bolted to the motor housing portion.

7. An axle assembly for a vehicle, comprising:
a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space;
an electric drive unit housed within the banjo axle housing, the electric drive unit comprising:
a motor that drives rotation of a rotor shaft;
a housing that houses the motor and that is disposed within the receiving space defined by the central portion of the banjo axle housing, the housing having a first portion and a second portion that is fastened to and positioned axially adjacent to the first portion of the housing, wherein at least one of the first portion and the second portion is fastened to the central portion of the banjo axle housing;
a first output shaft; and
a second output shaft, wherein the first output shaft and the second output shaft are operably coupled to the rotor shaft via a gearset;
a first half shaft that extends within the first beam hollow and that is engaged with the first output shaft; and a second half shaft that extends within the second beam hollow, and that is engaged with the second output shaft, wherein the rotor shaft, the first half shaft, and the second half shaft are coaxially aligned.

8. The axle assembly of claim 7, further comprising:
a first wheel hub coupled to the first half shaft;
a first wheel bearing disposed radially between the first wheel hub and the first beam and configured to support the first wheel hub and facilitate rotation of the first wheel hub relative to the first beam;
a second wheel hub coupled to the second half shaft; and
a second wheel bearing disposed radially between the second wheel hub and the second beam and configured to support the second wheel hub and facilitate rotation of the second wheel hub relative to the second beam.

9. The axle assembly of claim 7, wherein the first portion is fastened to the central portion.

10. The axle assembly of claim 7, wherein the second portion is fastened to the central portion.

11. The axle assembly of claim 7, wherein the first portion houses the motor and the second portion forms a gearbox of the electric drive unit that houses the gearset.

12. The axle assembly of claim 7, wherein the first and second beams are integrally coupled with the central portion of the banjo axle housing.

13. An axle assembly for a vehicle, comprising:
a banjo axle housing having a central portion that defines a receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space;
an electric drive unit housed within the banjo axle housing and having a motor disposed within the receiving space that drives rotation of a rotor shaft, wherein the electric drive unit further comprises:
a first output shaft; and
a second output shaft, wherein the first output shaft and the second output shaft are operably coupled to the rotor shaft via a first gearset;
a first half shaft that extends within the first beam hollow and that is engaged with the first output shaft; and
a second half shaft that extends within the second beam hollow, and that is engaged with the second output shaft, wherein the rotor shaft, the first half shaft, and the second half shaft are coaxially aligned.

14. The axle assembly of claim 13, further comprising:
a first wheel hub coupled to the first half shaft;
a first wheel bearing disposed radially between the first wheel hub and the first beam and configured to support the first wheel hub and facilitate rotation of the first wheel hub relative to the first beam;
a second wheel hub coupled to the second half shaft; and
a second wheel bearing disposed radially between the second wheel hub and the second beam and configured to support the second wheel hub and facilitate rotation of the second wheel hub relative to the second beam.

15. The axle assembly of claim 13, wherein the electric drive unit further comprises:
a housing that houses the motor and that is disposed within the receiving space defined by the central portion of the banjo axle housing, the housing having a first portion that is fastened to the central portion, and a second portion that is positioned axially adjacent to the first portion of the housing.

16. The axle assembly of claim 15, wherein the first portion is a motor housing portion of the housing, the second portion is a first lateral portion of the housing, and the housing further comprises:
a second lateral portion that is fastened to and positioned axially adjacent to the motor housing portion of the housing, wherein the motor housing portion is positioned axially between the first and second lateral portions of the housing.

17. The axle assembly of claim 16, wherein the first lateral portion forms a gearbox of the electric drive unit that houses the first gearset.

18. The axle assembly of claim 16, wherein the motor housing portion of the housing is bolted to the central portion of the banjo axle housing, the first lateral portion of the housing is bolted to the motor housing portion, and the second lateral portion is bolted to the motor housing portion.

19. The axle assembly of claim 13, wherein the first and second beams are integrally coupled with the central portion of the banjo axle housing.

20. The axle assembly of claim 4, wherein the first output shaft is operably coupled with the rotor shaft via the gearset and the second output shaft is operably coupled with the rotor shaft via the gearset.

* * * * *